(12) United States Patent
Buhl (10) Patent No.: US 11,434,844 B2
(45) Date of Patent: Sep. 6, 2022

(54) METHOD FOR CHECKING A VARIABLE VALVE LIFT CONTROL OF AN INTERNAL COMBUSTION ENGINE

(71) Applicant: Vitesco Technologies GmbH, Hannover (DE)

(72) Inventor: Stefan Buhl, Munich (DE)

(73) Assignee: VITESCO TECHNOLOGIES GMBH, Hannover (DE)

(*) Notice: Subject to any disclaimer, the term of this patent is extended or adjusted under 35 U.S.C. 154(b) by 176 days.

(21) Appl. No.: 16/982,267

(22) PCT Filed: Mar. 8, 2019

(86) PCT No.: PCT/EP2019/055857
§ 371 (c)(1),
(2) Date: Sep. 18, 2020

(87) PCT Pub. No.: WO2019/179790
PCT Pub. Date: Sep. 26, 2019

(65) Prior Publication Data
US 2021/0047949 A1 Feb. 18, 2021

(30) Foreign Application Priority Data
Mar. 22, 2018 (DE) .................... 10 2018 204 450.3

(51) Int. Cl.
*F02D 41/22* (2006.01)
*F01L 13/00* (2006.01)
(Continued)

(52) U.S. Cl.
CPC ........... *F02D 41/221* (2013.01); *B60W 50/02* (2013.01); *F01L 13/00* (2013.01); *F01L 31/00* (2013.01);
(Continued)

(58) Field of Classification Search
CPC ............. B60W 50/02; B60W 50/0205; B60W 2050/021; F01L 2800/00; F01L 2800/11; F02D 41/22; F02D 41/221
(Continued)

(56) References Cited

U.S. PATENT DOCUMENTS 5,862,507 A    1/1999  Wu .............................. 701/111
6,213,068 B1   4/2001  Hassdenteufel ........... 123/90.15
(Continued)

FOREIGN PATENT DOCUMENTS

CN    201810360 U    4/2011   ................ F01L 1/34
CN    103912334 A    7/2014   .............. F01L 13/00
(Continued)

OTHER PUBLICATIONS

Korean Notice of Allowance, Application No. 2022004405474, 3 pages, dated Jan. 17, 2022.
(Continued)

*Primary Examiner* — Robert A Werner
(74) *Attorney, Agent, or Firm* — Slayden Grubert Beard PLLC (57) ABSTRACT

Various embodiments include a method for checking a variable valve lift control of an internal combustion engine comprising: during operation of the internal combustion engine, detecting a rotational speed of the internal combustion engine; and measuring an intake pressure in the intake tract of the internal combustion engine corresponding to the detected rotational speed. The method further includes: defining a reference frequency dependent on the rotational speed of the internal combustion engine; defining a comparison frequency as a non-integral multiple of the reference frequency; determining amplitudes of oscillations of the intake pressure at the reference frequency and amplitudes of oscillations of the intake pressure at the comparison fre-
(Continued)

quency; and evaluating a ratio of the determined amplitudes and the respective absolute values.

7 Claims, 5 Drawing Sheets

(51) Int. Cl.
  *B60W 50/02* (2012.01)
  *F01L 31/00* (2006.01)
  *F02D 13/02* (2006.01)
(52) U.S. Cl.
  CPC ..... *F02D 13/0207* (2013.01); *F01L 2013/118* (2013.01); *F01L 2800/11* (2013.01)
(58) Field of Classification Search
  USPC ................ 701/107, 114; 73/114.25, 114.31, 73/114.37, 114.77, 114.79
  See application file for complete search history.

(56) References Cited

U.S. PATENT DOCUMENTS

| | | | | |
|---|---|---|---|---|
| 7,027,910 | B1* | 4/2006 | Javaherian | .......... F02D 41/1438 |
| | | | | 123/406.24 |
| 7,139,655 | B2 | 11/2006 | Nakazawa et al. | ........... 701/102 |
| 2011/0137509 | A1* | 6/2011 | Sarac | .................... F02D 41/221 |
| | | | | 73/114.37 |
| 2013/0073174 | A1 | 3/2013 | Worden | ........................ 701/102 |
| 2016/0169141 | A1 | 6/2016 | Flynn | ...................... F02D 41/26 |
| 2017/0198649 | A1 | 7/2017 | Kainz | ................... F02D 41/009 |
| 2018/0087460 | A1 | 3/2018 | Pathan | .................. F02D 35/027 |
| 2018/0355876 | A1* | 12/2018 | Sase | ......................... F02B 37/12 |
| 2020/0033173 | A1* | 1/2020 | Kitahara | .................. G01F 1/72 |

FOREIGN PATENT DOCUMENTS

| | | | | |
|---|---|---|---|---|
| DE | 10 2008 001 099 | | 4/2008 | ............ F02D 41/22 |
| DE | 10 2009 051 624 | | 7/2009 | ............ F02D 41/00 |
| DE | 11 2012 003 853 | | 9/2011 | ............ F02D 41/22 |
| DE | 10 2015 121 922 | | 12/2014 | ............ F02D 19/08 |
| DE | 10 2016 009 988 | | 8/2016 | ............ F02D 41/22 |
| DE | 10 2017 122 057 | | 9/2016 | ............ F02D 41/22 |
| EP | 0462853 | A1 | 12/1991 | ............... F01L 1/26 |
| EP | 1 460 254 | | 3/2003 | ............ F02D 41/00 |
| EP | 1 580 407 | | 3/2004 | ............ F01L 13/00 |
| EP | 1 754 867 | | 8/2005 | ............ F01L 13/00 |
| EP | 1580407 | A1 * | 9/2005 | .......... F01L 13/0036 |
| EP | 2 3 86 742 | | 1/2009 | ............ F02D 13/02 |
| FR | 2663682 | A1 | 12/1991 | ............... F01L 1/26 |
| JP | H07 238822 | | 2/1994 | ............ F01L 13/00 |
| KR | 20060047201 | A | 5/2006 | ............ F02D 41/32 |

OTHER PUBLICATIONS

Search Report for International Application No. PCT/EP2019/055857, 12 pages, dated May 28, 2019.
Office Action for DE Patent Application No. 10 2018 204 450.3, 7 pages, dated Oct. 11, 2018.
Chinese Office Action, Application No. 201980021044.3, 15 pages, dated Sep. 18, 2021.

* cited by examiner

METHOD FOR CHECKING A VARIABLE VALVE LIFT CONTROL OF AN INTERNAL COMBUSTION ENGINE

CROSS-REFERENCE TO RELATED APPLICATIONS

This application is a U.S. National Stage Application of International Application No. PCT/EP2019/055857 filed Mar. 8, 2019, which designates the United States of America, and claims priority to DE Application No. 10 2018 204 450.3 filed Mar. 22, 2018, the contents of which are hereby incorporated by reference in their entirety.

TECHNICAL FIELD

The present disclosure relates to internal combustion engines. Various embodiments include methods and/or devices for checking a variable valve lift control of an internal combustion engine

BACKGROUND

Modern internal combustion engines are frequently equipped with variable valve lift control systems which have a favorable effect on various characteristic data (e.g. fuel consumption, power development, emissions, etc.) of the internal combustion engines. In order to avoid disadvantages with respect to exhaust gas emissions, the valve lift change caused by the valve lift control must take place precisely and reliably. Here, amongst others, systems are used which are actuated indirectly (e.g. by means of hydraulic actuators) and/or in which electric actuators do not allow conclusions about a correctly executed valve lift change.

A logical actuation of the valve lift control takes place by means of electronic engine control units (ECU). Usually, all cylinders of at least one cylinder bank are actuated in the same way, wherein valves are opened during intake and expulsion. Signals are converted into actions via actuators, e.g. electrical, hydraulic systems, etc. One problem in operation of the variable valve lift control may be that if the valve lift switching is not functioning cleanly, the fuel consumption and/or pollutant emissions of the internal combustion engine deteriorate as a result.

One option for diagnosing a possible fault without using additional sensors is to evaluate the intake- and exhaust-side system behavior with respect to physical variables (e.g. the pressure development in the intake tract). In the case of a merely partially successful valve lift change (i.e. uneven valve lifts on a cylinder bank), the air mass aspirated by the individual cylinders may differ substantially. This great difference in the individual intake cycles leads to a characteristic excitation of the intake tract, which can be identified from the pressure signal.

Figure 1:
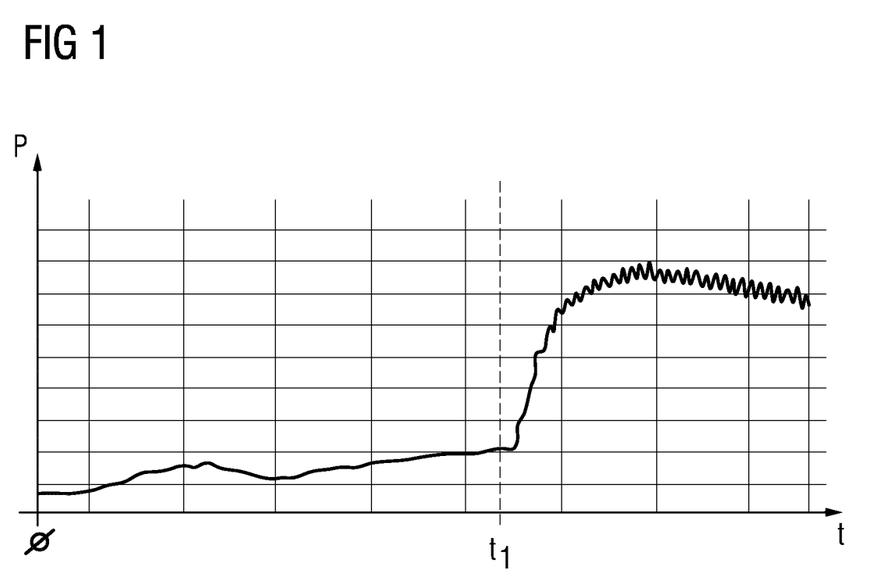
FIG. 1 a temporal development of an intake pressure signal of a variable valve lift control of an internal combustion engine.

FIG. 1 shows a depiction in principle of a chronological development of the intake pressure signal P in a manifold channel of the intake tract of an internal combustion engine. In a first portion from t=0 to $t_1$, the valve lift of all cylinders of the internal combustion engine is substantially identical (fault-free system). It is evident that in this case, the intake pressure signal P shows a temporally relatively constant development. After time $t_1$, because of a faulty valve lift control, different valve lifts occur for individual cylinders (defective system).

This results in oscillations of the intake pressure signal P in the intake tract. The development of the intake pressure signal P depicted in the right-hand portion of FIG. 1 is achieved for example if actuation was interrupted for one actuator of the variable valve lift control system. This means that one of the four cylinders remains in the "old lift", leading to pressure oscillations in the manifold channel of the intake tract.

Transformation of the pressure signal P in the Fourier space, often carried out by means of DFT (discrete Fourier transformation) or FFT (fast Fourier transformation) offers one possibility of identifying a fault in the valve lift switching.

Figure 2:
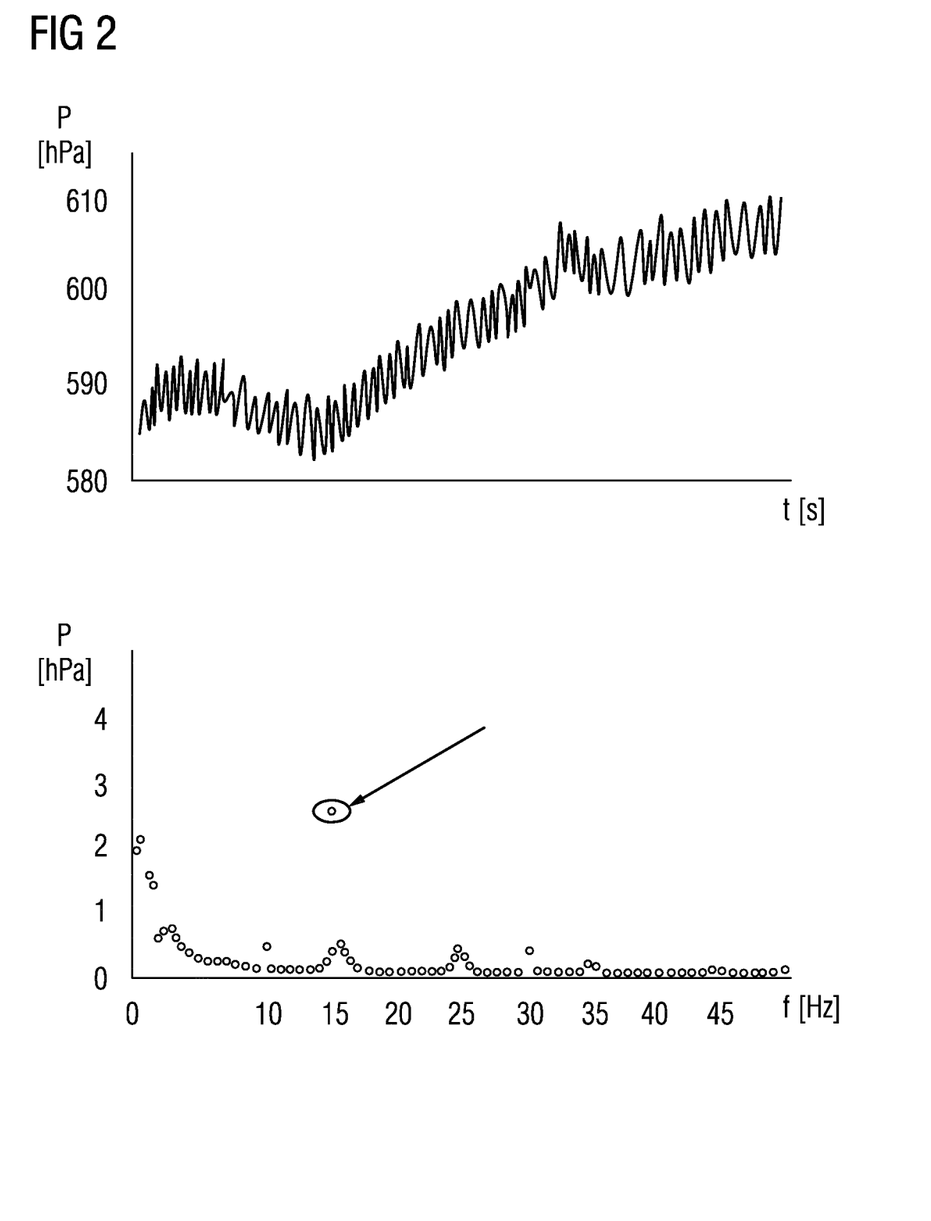
FIG. 2 a temporal development of an intake pressure signal of a variable valve lift control with a fault on one cylinder of the internal combustion engine.

FIG. 2 shows a temporal development of the intake pressure signal P during a fault in a single cylinder of a four-cylinder internal combustion engine. The pressure cylinder is connected to the manifold channel of the intake tract and measures the intake pressure signal P.

In a lower portion of FIG. 2, it is evident that at a reference frequency of 15 Hz, an excitation of the intake pressure signal P occurs (highlighted by an oval border). The lower portion of FIG. 2 shows the intake pressure signal P transformed in the Fourier space. Each cylinder carries out one intake cycle every two crankshaft revolutions. The four cycles of the four-cylinder engine take two crankshaft revolutions, giving 15 crankshaft revolutions per second. The 15 Hz of the intake pressure signal P thus correlate to an engine rotational speed of 1800 rpm. It is furthermore evident from the lower portion of FIG. 2 that on a fault in one cylinder, an excitation of the intake pressure signal P also takes place at 30 Hz but to a less significant level.

Figure 3:
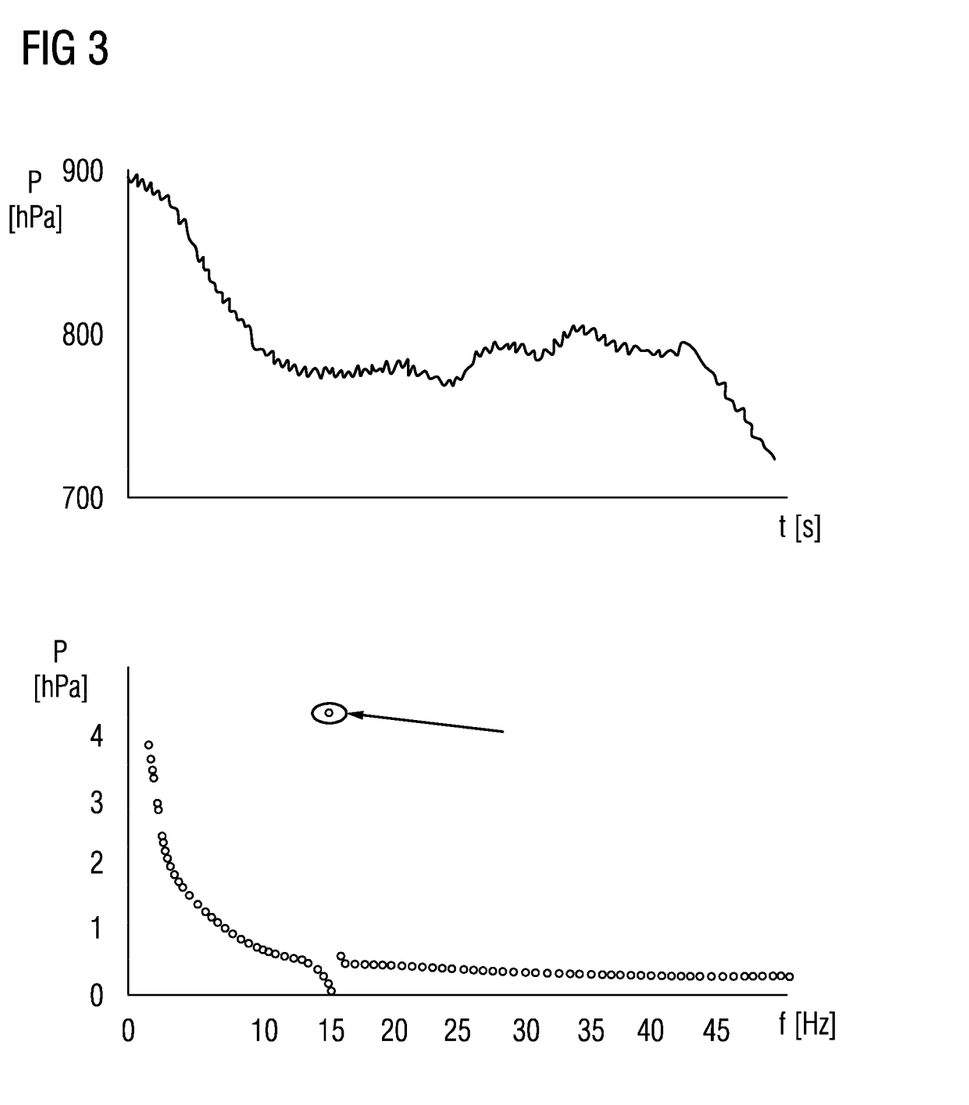
FIG. 3 a temporal development of an intake pressure signal of a variable valve lift control with a fault on two cylinders of the internal combustion engine.

FIG. 3 shows a scenario of a temporal development of the intake pressure signal P during faulty actuation of the variable valve lift control of two cylinders of a four-cylinder engine. In the upper portion of FIG. 3, it can be seen that the mean of the pressure signal P is not static in the case of a fault. In this case too, a defined excitation of the pressure signal P occurs in the frequency space at the reference frequency of 15 Hz (highlighted by the oval border). This is because a multiplication of faults in several cylinders is reflected in a correlation between the rotational speed of the engine and a specific type of pressure amplitude of the intake pressure signal P, because there is a connection between the rotational speed of the internal combustion engine and the number of intake cycles performed. The intake pressure signal P in the manifold channel of the intake tract here executes high-frequency oscillations correlating to the engine rotational speed.

The lower portion of FIG. 3 shows that, in the case of a fault on two cylinders of the four-cylinder engine, an excitation of the intake pressure signal P also occurs at 15 Hz. It is furthermore evident that in the Fourier space, all higher frequencies greater than 15 Hz of the intake pressure signal P have small amplitudes. The high values of the intake pressure signal P between zero and 10 Hz in the lower portion of FIG. 3 is due to the fact that the intake pressure signal P is not static.

To resolve this problem, various concepts have been used. It may be provided that a direct comparison of physical variables is performed, based on an expectation value belonging to the operational point and a measurement value. As disclosed in U.S. Pat. No. 6,213,068 B1, the air mass drawn into the cylinder may be used, or as disclosed in DE 10 2008 001 099 A1, the pressure development in the intake system. EP 1 754 867 A1 presents a similar procedure based on the internal cylinder pressure or the torque emitted by the cylinder/engine.

These approaches require a very good mathematical model, wherein small errors only cause a slight deviation from the model. The problem then lies in setting a threshold above which a fault is detected. Usually, all n (e.g. four) cylinders on one bank are switched, wherein a deviation between the model and measurement may be very small. Thus it is not guaranteed that a fault can be reliably detected.

A further known concept, as disclosed for example in EP 1 460 254 A1 and EP 1 580 407 A1, is to evaluate pressure fluctuations in two mutually independent intake systems in order to diagnose any faults in the inlet system. For this, the amplitude in mutually independent intake systems is estimated by detection of local maximum and minima and averaged over a defined number of work cycles. A comparison between the mean amplitudes is then made, and the system state is evaluated as OK/NOK. In a conventional in-line engine however, in all probability, this principle does not work because usually this has only a single intake system.

A further known concept, as disclosed in EP 2 386 742 A1, evaluates or monitors the time at which the inlet and exhaust valves close. The impact of the valves on the valve seat is associated with an acoustic signal which is picked up by a knock sensor and transformed in the Fourier space. Then characteristic frequencies of the knock signal are evaluated. For this, a complete Fourier transformation is performed, which disadvantageously is very calculation-intensive.

SUMMARY

Teachings of the present disclosure provide an efficient monitoring system for a variable valve lift control of an internal combustion engine. For example, some embodiments include a method for checking a variable valve lift control of an internal combustion engine, wherein during operation of the internal combustion engine, the following steps are performed:
  detection of a rotational speed of the internal combustion engine;
  measurement of an intake pressure in the intake tract of the internal combustion engine; wherein in a defined static behavior of the internal combustion engine, the following steps are performed at discrete times:
  definition of a reference frequency dependent on the rotational speed of the internal combustion engine;
  definition of a comparison frequency;
  determination of amplitudes of oscillations of the intake pressure in the intake tract of the internal combustion engine at the reference frequency, and of amplitudes of oscillations of the intake pressure in the intake tract of the internal combustion engine at the comparison frequency; and
  defined evaluation of a ratio of the determined amplitudes and their absolute values.

As another example, some embodiments include a device for checking a variable valve lift control of an internal combustion engine, by means of which, during operation of the internal combustion engine, the following steps can be performed:
  a detection device for detection of a rotational speed of the internal combustion engine;
  a measurement device for measuring an intake pressure in the intake tract of the internal combustion engine; and
  a calculation device which is configured, in a defined static behavior of the internal combustion engine, to perform the following steps at discrete times:
  definition of a reference frequency dependent on the rotational speed of the internal combustion engine;
  definition of a comparison frequency as a non-integral multiple of the reference frequency;
  determination of amplitudes of oscillations of the intake pressure in the intake tract of the internal combustion engine at the reference frequency, and of amplitudes of oscillations of the intake pressure in the intake tract of the internal combustion engine at the comparison frequency; and
  defined evaluation of a ratio of the determined amplitudes and their absolute values.

BRIEF DESCRIPTION OF THE DRAWINGS

Further features and advantages of the teachings herein are discussed below with reference to several figures. The figures show.

DETAILED DESCRIPTION

The present disclosure describes methods and devices for monitoring a variable valve lift control, which check whether the valve switching has functioned correctly. It has already been established in advance which frequencies should be considered. The amplitudes of the intake pressure signal are evaluated at only two frequencies. As a result, this means a limited and low calculation complexity, so that the method can be implemented well in existing electronic vehicle control devices. Furthermore, the proposed system is sufficiently sensitive to also establish faults on only one cylinder, which cannot be ensured with the known methods described above.

In some embodiments, the amplitudes are determined using a Görtzel algorithm. This merely means a lower calculation complexity in comparison with a conventional classic Fourier transformation.

In some embodiments, the ratio of the determined amplitudes is evaluated on the basis of criteria specific to the internal combustion engine. In this way, the method can also be adapted very precisely to the checked internal combustion engine concerned, and thereby allows a precise conclusion about the variable valve lift control of the respective internal combustion engine.

In some embodiments, the non-integral multiple lies in a range between 1.3 and 1.7, e.g. 1.5. In this way, a suitable range of the ratio between reference frequency and comparison frequency is used, which allows a good conclusion about a state of the variable valve lift control of the internal combustion engine.

In some embodiments, in the case that the two amplitudes have a defined ratio to each other and an absolute value of the reference amplitudes defined is significantly greater than zero, a fault in the variable valve lift control is detected.

In some embodiments, in the case that the two amplitudes have the same order of magnitude and both values are close to zero, the variable valve lift control is detected as fault-free. In this way, criteria are defined by which a clear distinction can be made between a defective and a fault-free valve lift control.

Figure 4:
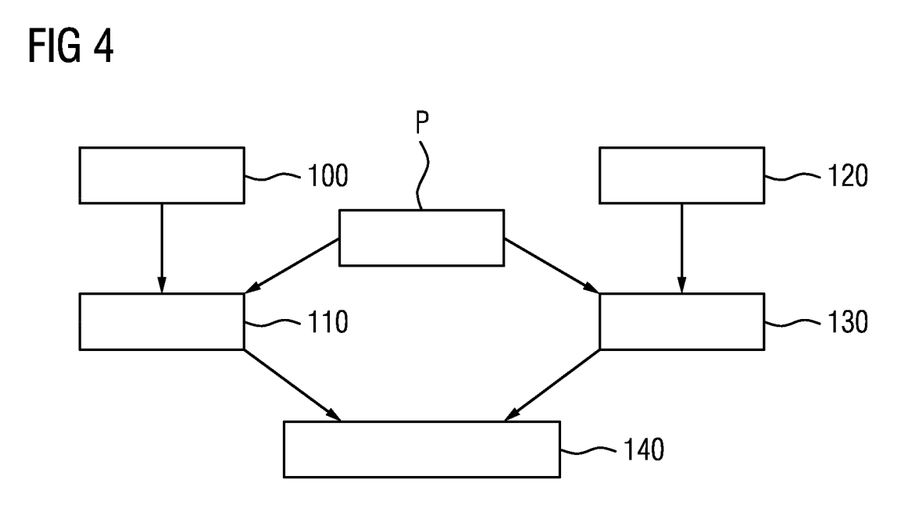
FIG. 4 a flowchart for one embodiment of a method incorporating teachings of the present disclosure.

FIG. 4 shows a flow chart for an example method incorporating teachings of the present disclosure. In a step 100, a reference frequency $f_R$ of the internal combustion engine is determined as a function of the rotational speed of the internal combustion engine. At the same time, the intake pressure signal P in the manifold intake tract of the internal combustion engine is measured by means of a pressure sensor. In a step 110, using the determined reference frequency $f_R$ and the intake pressure signal P, a reference amplitude $Af_R$ of the intake pressure signal P is calculated using the Görtzel algorithm.

In a step 120, a comparison frequency $f_V$ is determined which constitutes a non-integral multiple of the reference frequency $f_R$. The intake pressure signal P together with the comparison frequency $f_V$ is used to calculate, in a step 130, the comparison amplitude $A_V$ of the oscillations of the intake pressure signal P at the comparison frequency $f_V$.

In a step 140, the determined reference amplitude $A_R$ is compared with the comparison amplitude $A_V$ and the comparison is evaluated, wherein defined criteria of the internal combustion engine are used.

Figure 5:
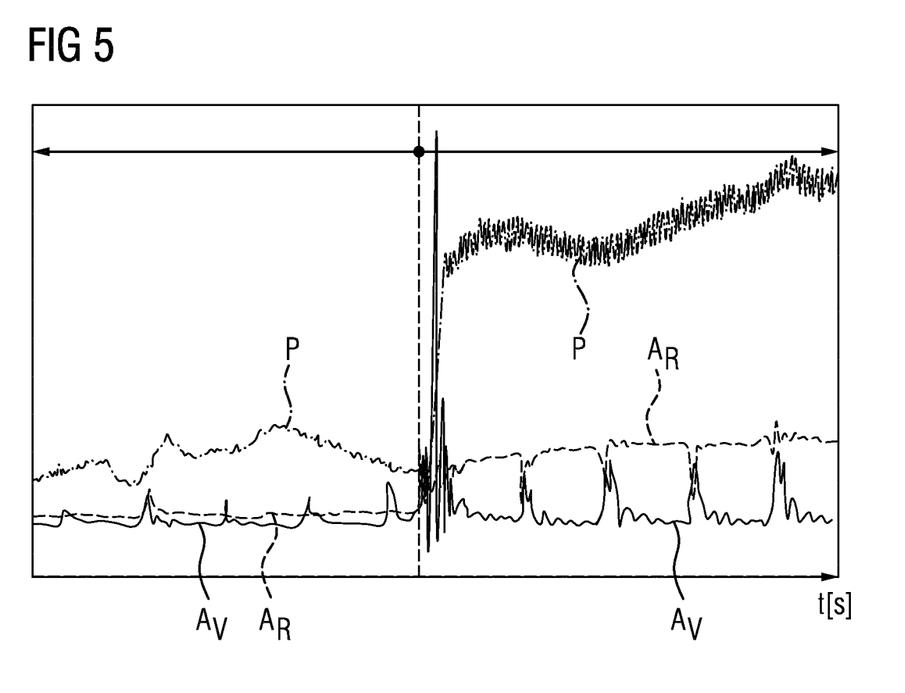
FIG. 5 a temporal development of an intake pressure signal of a variable valve lift control of an internal combustion engine, with both intake pressure signals evaluated using methods and/or devices incorporating teachings of the present disclosure.

FIG. 5 shows a temporal development of the intake pressure signal P together with the temporal development of the reference amplitude $A_R$ and of the comparison amplitude $A_V$ of the intake pressure signal P at the reference frequency $f_R$ and at the comparison frequency $f_V$ respectively. It is evident that the intake pressure signal P in the left-hand portion which represents a fault-free system, and in the right-hand portion which represents a defective system, are configured differently. It is evident that the harmonic components on the intake pressure signal P in the case of a fault are substantially higher than in the fault-free case.

Said Görtzel algorithm is carried out continuously during operation of the internal combustion engine. The comparison frequency $f_V$ is the reference frequency $f_R$ multiplied by a non-integral factor. In some embodiments, the factor lies in a range between 1.3 and 1.7, e.g. 1.5.

A non-integral ratio of the comparison frequency $f_V$ to the reference frequency $f_R$ is justified in that, on a fault in one or more cylinders of the internal combustion engine (e.g. a four-cylinder engine), an integral factor would in each case influence the excitation of the intake pressure signal P. Thus a fault in the variable valve lift control in the frequency space is not reflected in a non-integral multiple of oscillations of the intake pressure P, so that a fault can easily be distinguished from a correct state of the variable valve lift control. The selected non-integral factor should be adapted to the respective internal combustion engine to be checked, which requires a specific calibration process for the respective internal combustion engine to be checked.

It must be taken into account that the closer the factor lies to an integral multiple, the smaller the deviations of the reference frequency $f_R$ from the comparison frequency $f_V$. The aim is therefore a non-integral factor in which the deviations of the reference from the comparison frequency in the case of a fault are as small as possible. In the fault-free case (left-hand portion of FIG. 5), it is evident that the amplitudes $A_R$, $A_V$ of the reference and comparison frequencies $f_R$, $f_V$ are very similar, wherein peaks on the comparison amplitude $A_V$ each constitute a start of performance of the Görtzel algorithm. A permitted order of magnitude of a ratio of amplitudes $A_R$, $A_V$ lies in a range from around 2 to around 3.

In the first matrix after the dotted centre line of the right-hand portion of FIG. 5 (fault case), the values of the reference aptitude $A_R$ and the comparison amplitude $A_V$ are not static, or have greatly increased oscillations, whereby these values are rejected and the Görtzel algorithm is not performed. In the faulty region, the reference amplitude $A_R$ shifts upward and the comparison amplitude $A_V$ shifts downward, so that as a result, the two amplitudes $A_R$, $A_V$ differ greatly.

In some embodiments, the internal combustion engine has a steady rotational speed to a certain extent, wherein a degree of deviation is indeed permissible in a transient region; if however this region is exceeded (e.g. during a strong acceleration process), the method cannot function because in this case, the changes to the engine rotational speed and intake pressure P in the intake tract are too great (not shown in the figures). The extent of the respective transience in which the method cannot function cannot be specified generally, but must be specified for each internal combustion engine individually. In some embodiments, the real-time performance of the proposed method allows an evaluation to start afresh whenever said necessary conditions of the static state are present again.

As a result, this means that a fault detected by means of the proposed method must be confirmed or reproduced several times before a genuine fault is identified. A mathematical formula apparatus for performance of the Görtzel algorithm is as follows:

$$\omega = (2 \times \Pi / n) \times f$$

n . . . sampling or scanning rate of the method
$\Pi$ . . . pi $$Q_t = 2 \times \cos \omega \times Q_{t-1} - Q_{t-2} + P_t + P_{akt}$$

$Q_t$ . . . temporary value of intake pressure P
$P_t$ . . . actual value of intake pressure P
t . . . actual time stage $$A = \text{SQR}(Q_{t-1}^2 + Q_{t-2}^2 - Q_{t-1} \times Q_{t-2} \times 2 \times \cos \omega)$$

A . . . amplitude of superposed pressure fluctuations in Pa
SQR . . . square root Said procedure of the Görtzel algorithm should be carried out for the reference frequency $f_R$ and also for the associated comparison frequency $f_V$.

As a result, using the method described, a reduced Fourier transformation is performed in the form of a Görtzel algorithm, by means of which pre-specified frequencies of oscillations of the intake pressure P are analysed.

In some embodiments, a reliable detection and high sensitivity can be achieved. Furthermore, no comparison with modeled values is necessary, since these are real values from real operation of the internal combustion engine. Moreover, it is also possible to check internal combustion engines with cylinder banks which are not mutually independent. Also, in comparison with conventional methods with DFT/FFT processes, merely a low calculation power is sufficient for the method.

Figure 6:
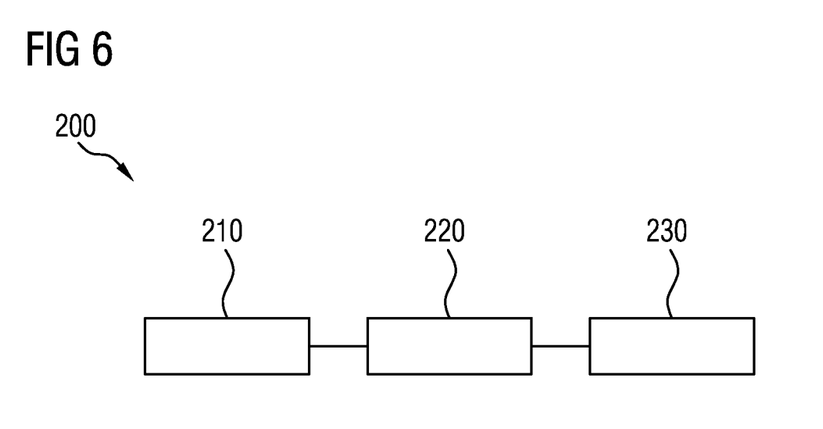
FIG. 6 a block circuit diagram in principle of a device for performance of a method incorporating teachings of the present disclosure.

FIG. 6 shows a block circuit diagram of a device 200 incorporating teachings of the present disclosure for checking a variable valve lift control. A detection device 200 can be seen for detecting a rotational speed of the internal combustion engine; said detection device is functionally connected to a measuring device 210 (e.g. pressure sensor) for measuring an intake pressure P in the intake tract of the internal combustion engine. A calculation device 220 is functionally connected to the measuring device 210 and is configured, in a defined static behavior of the internal combustion engine, to perform the following steps at discrete times:

definition of a reference frequency $f_R$ dependent on the rotational speed of the internal combustion engine;

definition of a comparison frequency $f_V$ as a non-integral multiple of the reference frequency $f_R$;

determination of amplitudes $A_R$ of oscillations of the intake pressure P in the intake tract of the internal combustion engine at the reference frequency $f_R$, and of amplitudes of oscillations of the intake pressure P in the intake tract of the internal combustion engine at the comparison frequency $f_V$; and defined evaluation of a ratio of the determined amplitudes $A_R$, $A_V$.

In some embodiments, the device 200 may be configured as an electronic engine control unit on which the method is executed as software. This supports easy adaptability of the method.

Figure 7:
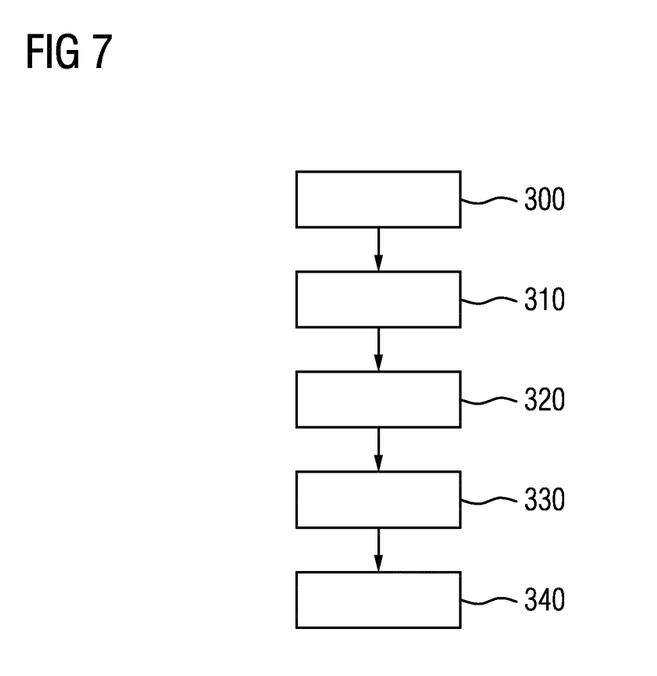
FIG. 7 a flow chart of an example method for checking a variable valve lift control of an internal combustion engine incorporating teachings of the present disclosure.

FIG. 7 shows a flowchart for an example method for checking a variable valve lift control of an internal combustion engine incorporating teachings of the present disclosure.

In a step 300, a rotational speed of the internal combustion engine is detected.

In a step 310, the intake pressure P in the intake tract of the internal combustion engine is measured.

In a step 320, a reference frequency $f_R$ is defined which is dependent on the rotational speed of the internal combustion engine, and a comparison frequency $f_V$ is defined as a non-integral multiple of the reference frequency $f_R$.

In a step 330, determination takes place of amplitudes $A_R$ of oscillations of the intake pressure P in the intake tract of the internal combustion engine at the reference frequency $f_R$, and of amplitudes of oscillations of the intake pressure P in the intake tract of the internal combustion engine at the comparison frequency $f_V$.

In a defined static behavior of the internal combustion engine, the following steps are performed at discrete times:
In a step 340, a defined evaluation of a ratio of the determined amplitudes $A_R$, $A_V$ and their absolute values is performed.

What is claimed is:

1. A method for checking a variable valve lift control of an internal combustion engine, the method comprising:
during operation of the internal combustion engine,
detecting a rotational speed of the internal combustion engine;
measuring an intake pressure in the intake tract of the internal combustion engine corresponding to the detected rotational speed;
defining a reference frequency dependent on the rotational speed of the internal combustion engine;
defining a comparison frequency as a non-integral multiple of the reference frequency;
determining amplitudes of oscillations of the intake pressure at the reference frequency and amplitudes of oscillations of the intake pressure at the comparison frequency; and
evaluating a ratio of the determined amplitudes and the respective absolute values.

2. The method as claimed in claim 1, wherein the determination of amplitudes includes using a Görtzel algorithm.

3. The method as claimed in claim 1, further comprising evaluating the ratio of the determined amplitudes on the basis of criteria specific to the internal combustion engine.

4. The method as claimed in claim 1, wherein the non-integral multiple lies in a range between 1.3 and 1.7.

5. The method as claimed in claim 1, further comprising identifying a fault in the variable valve lift control if the two amplitudes have a defined ratio to each other and an absolute value of the reference amplitudes significantly greater than zero.

6. The method as claimed in claim 1, further comprising identifying the variable valve lift control as fault-free if the two amplitudes have a shared order of magnitude and both values are close to zero.

7. A device for checking a variable valve lift control of an internal combustion engine, the device comprising:
a processor programmed to, during operation of the internal combustion engine:
receive a first signal from a detection device indicating a rotational speed of the internal combustion engine; and
receive a second signal from a measurement device indicating an intake pressure in the intake tract of the internal combustion engine; and
the processor further programmed to, in a defined static behavior of the internal combustion engine, at discrete times:
define a reference frequency dependent on the rotational speed of the internal combustion engine;
define a comparison frequency as a non-integral multiple of the reference frequency;
determine amplitudes of oscillations of the intake pressure at the reference frequency and amplitudes of oscillations of the intake pressure at the comparison frequency; and
evaluate a ratio of the determined amplitudes.

* * * * *